(12) United States Patent
Ettengruber et al.

(10) Patent No.: US 12,242,255 B2
(45) Date of Patent: Mar. 4, 2025

(54) METHOD FOR TRACKING A COMPONENT IN A PRODUCTION LINE COMPRISING A PLURALITY OF PROCESSING SYSTEMS, AND COMPUTING UNIT

(71) Applicant: Bayerische Motoren Werke Aktiengesellschaft, Munich (DE)

(72) Inventors: Gerhard Ettengruber, Simbach (DE); Bernhard Glueck, Fuerstenfeldbruck (DE); Stefan Werner, Regensburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 454 days.

(21) Appl. No.: 17/432,200

(22) PCT Filed: Mar. 12, 2020

(86) PCT No.: PCT/EP2020/056676
§ 371 (c)(1),
(2) Date: Aug. 19, 2021

(87) PCT Pub. No.: WO2020/216524
PCT Pub. Date: Oct. 29, 2020

(65) Prior Publication Data
US 2022/0187808 A1    Jun. 16, 2022

(30) Foreign Application Priority Data
Apr. 24, 2019   (DE) ..................... 10 2019 110 619.2

(51) Int. Cl.
*G05B 19/418*    (2006.01)
(52) U.S. Cl.
CPC ... *G05B 19/41875* (2013.01); *G05B 19/4183* (2013.01); *G05B 2219/42337* (2013.01)

(58) Field of Classification Search
CPC .......... G05B 19/41875; G05B 19/4183; G05B 2219/42337; G05B 2219/31282; Y02P 90/02; Y02P 90/30; G06Q 50/04
See application file for complete search history.

(56) References Cited

U.S. PATENT DOCUMENTS 5,239,487 A * 8/1993 Horejsi .................. G06Q 10/06
  706/916
6,311,301 B1 * 10/2001 Posse ................. G01R 31/2801
  714/724

(Continued)

FOREIGN PATENT DOCUMENTS

CN           107850889 A       3/2018
DE     10 2013 108 277 A1      6/2014

(Continued)

OTHER PUBLICATIONS

Aida, H. JP-2005108047-A English translation, 2005 (Year: 2005).*

(Continued)

*Primary Examiner* — Kamini S Shah
*Assistant Examiner* — Jonathan Michael Skrzycki
(74) *Attorney, Agent, or Firm* — Crowell & Moring LLP

(57) ABSTRACT

A method for tracking a component in a production line having a plurality of processing systems includes processing and/or testing, by each of the processing systems, the component, providing a processing signal characterizing the processing and/or testing for a higher-level electronic computing unit, and tracking, by the computing unit based on the received processing signals, the component through the production line. A query signal characterizing a component property of one of the processing systems of the production line is received by the computing unit. The component is ascertained by the computing unit and at least one compo- (Continued)

nent information signal characterizing the component property of the ascertained component is provided.

9 Claims, 1 Drawing Sheet

(56) References Cited

U.S. PATENT DOCUMENTS

| | | | |
|---|---|---|---|
| 2005/0010316 A1* | 1/2005 | Becker | G05B 19/0423 |
| | | | 700/96 |
| 2005/0113957 A1* | 5/2005 | Gallu | G05B 19/4183 |
| | | | 700/109 |
| 2008/0098007 A1* | 4/2008 | Nakamura | G06Q 50/00 |
| 2009/0204232 A1 | 8/2009 | Guru et al. | |
| 2013/0239330 A1 | 9/2013 | Newlin | |
| 2017/0153616 A1* | 6/2017 | Sakakibara | G05B 19/048 |
| 2017/0154386 A1 | 6/2017 | Hemmati et al. | |
| 2018/0335768 A1* | 11/2018 | Sano | G05B 19/41865 |
| 2018/0356804 A1* | 12/2018 | Oka | G05B 19/418 |
| 2019/0219979 A1* | 7/2019 | Floeder | G06F 9/30127 |
| 2020/0081419 A1* | 3/2020 | Lee | G06F 16/2379 |

FOREIGN PATENT DOCUMENTS

| | | |
|---|---|---|
| DE | 10 2015 221 417 A1 | 5/2017 |
| EP | 3 267 384 A1 | 1/2018 |
| EP | 3 358 430 A1 | 8/2018 |
| EP | 3 502 986 A1 | 6/2019 |
| JP | 2005108047 A * | 4/2005 |

OTHER PUBLICATIONS

International Search Report (PCT/ISA/210) issued in PCT Application No. PCT/EP2020/056676 dated Mar. 12, 2020 with English translation (five (5) pages).

German-language Written Opinion (PCT/ISA/237) issued in PCT Application No. PCT/EP2020/056676 dated Mar. 12, 2020 (eight (8) pages).

German-language Search Report issued in German Application No. 10 2019 110 619.2 dated Jan. 27, 2020 with English translation (11 pages).

English translation of Chinese-language Office Action issued in Chinese Application No. 202080017546.1 dated Jun. 29, 2023 (6 pages).

* cited by examiner

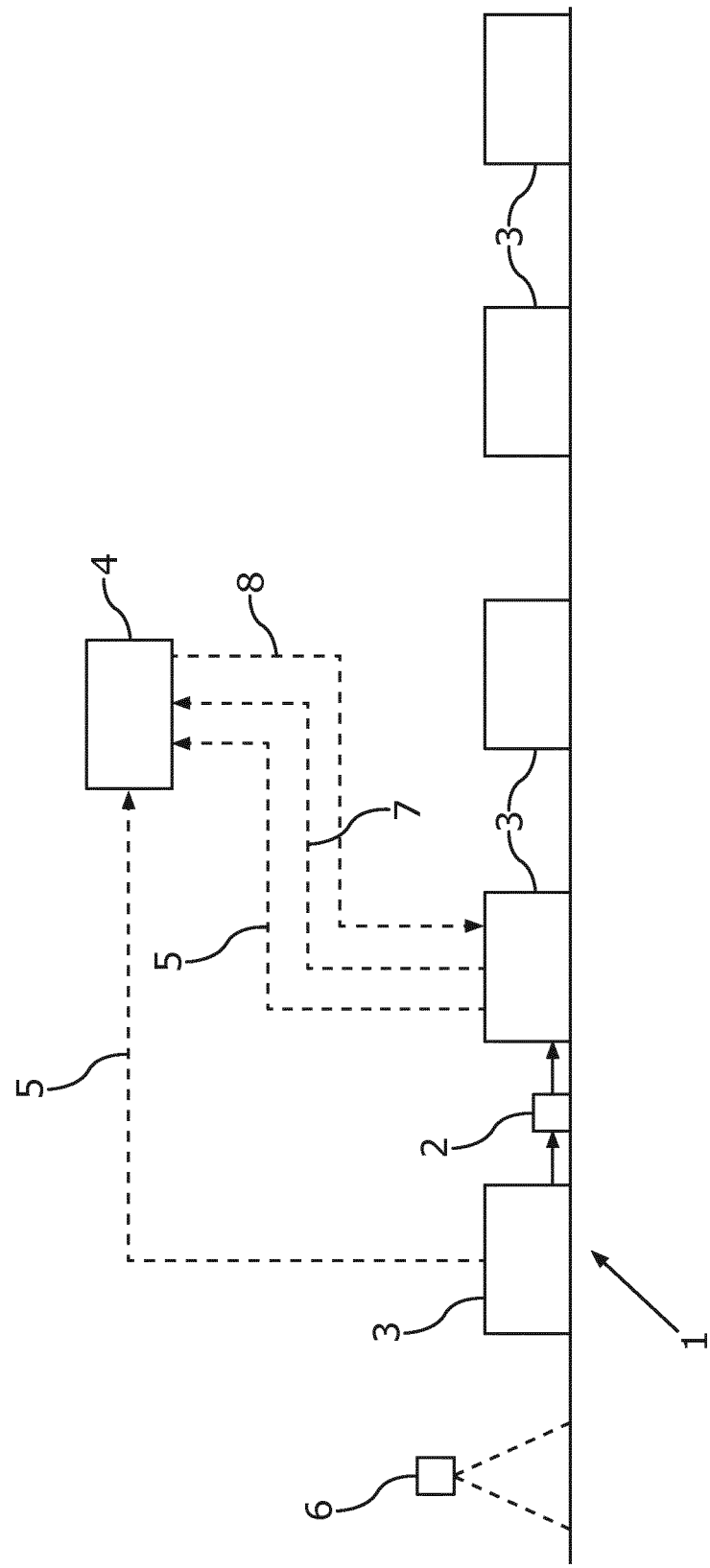

METHOD FOR TRACKING A COMPONENT IN A PRODUCTION LINE COMPRISING A PLURALITY OF PROCESSING SYSTEMS, AND COMPUTING UNIT

BACKGROUND AND SUMMARY OF THE INVENTION

The invention relates to a method and a computing device for tracking a component in a production line comprising a plurality of process systems.

DE 10 2013 108 277 A1 has already disclosed a method and a system for identifying components in a production line. In the method, for at least one object to be processed, a state currently assigned to the same object is stored in an electronically retrievable manner if the at least one object is to be discharged from a processing system, wherein the state is determined depending on the processing station through which the at least one object has passed until then. The current state of the at least one object is read out as an excerpt from a state log assigned to the at least one object. The state log is stored in a central database and is updated depending on the processing station through which the at least one object passes. On the basis of the state log, it is determined for the object whether the at least one object should be discharged from the processing system. The at least one object is uniquely identified by an RFID transponder locally fitted to the object.

The object of the present invention is to further develop a method and a computing device for tracking a component in a production system comprising a plurality of process systems of the type mentioned at the outset in such a manner that all process systems of the production line can be informed of the respective state of the component in a particularly advantageous manner.

This object is achieved according to the claimed invention.

A first aspect of the invention relates to a method for tracking at least one component in a production line comprising a plurality of process systems. The component is, in particular, a motor vehicle component which is to be processed as it passes through the production line. In the method, by way of respective process systems of the production line, the component is processed and/or tested and a respective processing signal characterizing the processing and/or the testing is provided for a superordinate electronic computing device. In other words, the component is processed and/or tested at least in one of the plurality of process systems of the production line, wherein this process system provides the processing signal for the superordinate computing device in order to inform the superordinate computing device of the processing and/or the testing. In particular, provision is made for the component to be tested and/or processed and/or handled differently by way of different process systems of the production line, in particular to be deposited in a twisted manner by way of a transport robot. On the basis of the respective received processing signals, which can also be referred to as test signals, the computing device determines a respective state of the component as a result of the processing carried out on the component by way of the at least one process system and/or on the basis of at least one test result which is determined for the component when testing the component and is received by the electronic computing device as the processing signal or at least as part of the processing signal. In the method, provision is also made for the component to be tracked through the production line along the plurality of process systems by way of the computing device on the basis of the received processing signals from the plurality of process systems. This means that the computing device determines, on the basis of the received processing signals, at which process system the component is situated at which time, with the result that the computing device can track a movement of the component through the production line via the plurality of process systems.

In order to be able to inform the respective process systems of the production line of the component processed and/or tested in the respective process system in a particularly advantageous manner, an embodiment of the invention provides for a request signal, which characterizes a component property, from one of the process systems of the production line to be received by way of the computing device, and for the component processed and/or tested in the process system to be determined and for at least one component information signal characterizing the component property of the determined component to be provided for the process system by way of the computing device. In other words, a process system wishing to receive an item of information relating to the component processed and/or tested in the process system transmits the request signal to the electronic computing device. The electronic computing device which is used to track components processed and/or tested in the production line is used to determine which component is characterized by the request signal. In this case, the request signal can relate to a component processed and/or tested at a particular predefined time in the respective process system. The electronic computing device determines, on the basis of the request signal, which component is being or has been processed and/or tested at the particular predefined time in the process system providing the request signal. The electronic computing device then provides the component information signal, which characterizes the component determined by the electronic computing device, for the process system providing the request signal. The component information signal characterizes the component which is being or has been processed and/or tested at the predefined time by the process system providing the request signal. In particular, a register may be stored in the electronic computing device, in which register at least one component tested and/or processed in the production line is assigned to a respective process system of the plurality of process systems in which the component is being processed and/or tested or is at least arranged at a current time. The method makes it possible for this information stored in the register to be provided on request for the respective process systems of the production line. The plurality of process systems of the production line can therefore be informed of the respective component processed and/or tested by the respective process systems in a particularly advantageous manner.

In this context, it has been shown to be advantageous if, by way of a process system in the form of a test system, a test result is determined by testing the component and, on the basis of the received component information signal, the test result is stored in a memory device of the test system in a manner assigned to the component characterized by the component information signal. In other words, the test system uses the request signal to ask the electronic computing device which component is currently being subjected to the testing in the test system. As a result of the component information signal received from the electronic computing device, the test system assigns the test result to the component characterized by the component information signal and stores the test result in the memory device in a manner assigned to the determined component. The particular advantage of this method is the fact that capture of a component identifier in the test system can cease since the register in the electronic computing device stores at what time which component is situated in the respective process systems or is processed and/or tested in the latter. This advantageously makes it possible to dispense with complicated component identification in the individual process systems of the production line.

A further advantageous configuration of the invention provides for a test result determined by way of the process system to be received by way of the electronic computing device and to be assigned to the tracked component. This means that the test result is received by way of the electronic computing device, is assigned to the component and is stored in the register. This makes it possible for both the component and the test result assigned to the component to be characterized as a component information signal for at least one of the process systems by way of the computing device. The component information signal can therefore be used to inform a first of the process systems of the test result of the component in a second process system, which differs from the first process system and was used to test and/or process the component before the first process system, in a particularly advantageous manner. For example, the first process system may report a quality defect of the component to the electronic computing device. The electronic computing device provides the component information signal characterizing the quality defect for a second process system which is used to deposit the component on a conveyor belt or a shelf in a twisted manner with respect to a starting position on account of the reception of the component information signal. Alternatively or additionally, a third process system can adapt process parameters of an operation of processing the component or components following the component as a result of the reception of the component information signal, thus making it possible to create a control loop.

In a further configuration of the invention, it has been shown to be advantageous if a serial number introduced into the component is captured as the component enters the production line and is provided for the computing device. The serial number can be engraved or lasered into the component or applied to the component in another manner. The electronic computing device assigns the captured serial number to the tracked component and stores the determined serial number in the register, in particular in a manner assigned to the component. In this case, the serial number of the component is not tracked further inside the production line. The practice of capturing the serial number as the component enters the production line has the advantage that the serial number is usually particularly clearly discernible and can therefore be determined in a particularly simple manner as the component enters the production line. As it passes through the production line, the component is processed and/or tested by way of the plurality of process systems, in which case the serial number can lose legibility. In the method, it is therefore possible for the serial number to be captured in its most legible state while arranging the component in the production line, in particular as the component enters the production line, and further capture of the serial number of the component as the component passes through the production line can cease since the component is tracked by way of the electronic computing device as it passes through the production line.

It has proved to be particularly advantageous if the component information signal characterizes the serial number and/or the test result of the component. This makes it possible for the process system providing the request signal to be informed of the serial number and/or the test result of the component on the basis of the component information signal. In particular, the test result was determined by a process system differing from the process system that provides the request signal. For example, by way of a first process system in the form of a first test system, a first test result can be determined and can be provided for the electronic computing device which stores the first test result in a manner assigned to the component. The request signal can then be provided by way of a second process system in the form of a second test system, whereupon the electronic computing device provides the component information signal for the second test system. This component information signal may characterize the serial number and/or the first test result of the component. The second test system may determine a second test result of the component and may store the second test result in the memory device of the second test system in a manner assigned to the serial number and/or to the first test result. As a result, a plurality of test results of the component, which have each been determined by way of different test systems, can be evaluated in a particularly simple manner together and therefore in association.

It has also been shown to be advantageous if the component is tracked in the computing device by way of a shift register. The shift register is a sequential logic system. In particular, the shift register is an electronic shift register. The component can be tracked in a particularly simple and particularly error-resistant manner by way of the electronic computing device along the production line using the shift register.

A further aspect of the invention relates to a computing device for tracking a component in a production line comprising a plurality of process systems. The computing device is configured to receive a processing signal which characterizes processing and/or testing of the component by way of respective process systems of the production line. The computing device is also configured to track the component through the production line along the plurality of process systems on the basis of the received processing signals. In order to make it possible to inform the process systems of the production line of respective processed and/or tested components in a particularly advantageous manner, an embodiment of the invention provides for the computing device to be configured to receive a request signal, which characterizes a component property, from at least one of the process systems of the production line, to determine the component processed and/or tested in the process system and to provide a component information signal characterizing the determined component for the process system. In particular, the computing device is configured to carry out the already described method according to an embodiment of the invention for tracking the component in the production line comprising a plurality of process systems.

Advantages and advantageous developments of the method according to embodiments of the invention can be considered to be advantages and advantageous developments of the computing device according to embodiments of the invention and vice versa. For this reason, the advantages and advantageous developments of the computing device according to embodiments of the invention are not described in any more detail here.

Further features of the invention emerge from the claims, the figures and the description of the FIGURES. The features and combinations of features mentioned above in the description and the features and combinations of features mentioned below in the description of the figures and/or shown in the FIGURES alone can be used not only in the respectively stated combination but also in other combinations or alone.

The invention is now explained in more detail on the basis of a preferred exemplary embodiment and with reference to the drawing.

BRIEF DESCRIPTION OF THE DRAWING

FIG. 1 shows a schematic side view of a production line having a plurality of process systems in which a component, in particular a motor vehicle component, can be respectively processed and/or tested, wherein the component passes through a plurality of process systems along the production line, and wherein an electronic computing device is provided and can be used to monitor the component passing through the production line.

DETAILED DESCRIPTION OF THE DRAWING

FIG. 1 illustrates a production line 1 in which a component 2, in particular a motor vehicle component, is processed and/or tested. The production line 1 comprises a plurality of process systems 3 which are each configured to test and/or process the component 2. As it passes through the production line 1, the component 2 is transferred between the respective process systems 3, with the result that the component 2 passes through a plurality of the process systems 3, in particular all process systems 3, of the production line 1.

An electronic computing device 4 is provided in order to be able to track particularly advantageous monitoring of a respective state of the component 2, in particular a position and/or a processing state and/or a test state. The processing state of the component 2 characterizes whether and, in particular, how the component 2 has been processed. The test state of the component 2 characterizes whether and, in particular, how the component 2 has been tested. In this case, the test state may comprise, in particular, a test result of the test. The electronic computing device 4 is configured to communicate with the process systems 3 of the production line 1 in a wireless manner and/or via cabling. In order to ensure that the electronic computing device 4 is informed at all times of where the component 2 is situated in the production line 1 and what a respective processing state and/or test state of the component 2 is like, the respective process systems 3 provide respective processing signals 5 characterizing the processing and/or the testing of the component 2 for the electronic computing device 4. The processing signals 5 may characterize the fact that the component 2 has been transferred from a first process system to a second process system and/or the fact that the component 2 has been subjected to a defined processing step inside one of the process systems 3 and/or the fact that the component 2 has been subjected to a check in the respective process system 3. In addition, the test result of the component 2, which is determined by way of the respective process system 3, can be provided for the electronic computing device 4 by way of the processing signal 5. The component 2 is tracked as it passes through the production line 1 via the plurality of process systems 3 by way of the computing device 4 using a register, in particular an electronic shift register. In particular, the electronic computing device 4 can assign the processing state and/or test state received via the respective processing signals 5 and/or the received test result to the tracked component 2 in the register and can store it in a manner assigned to the component 2.

In order to make it possible to track the component 2 along the production line 1 in a particularly advantageous manner, a capture device 6 is provided at the entrance of the production line 1. The component 2 can be uniquely identified by way of the capture device 6. In the present case, a serial number of the component 2 entering the production line 1 is captured by way of the capture device 6 and is provided for the electronic computing device 4. The electronic computing device 4 stores the captured serial number in the register in a manner assigned to the component 2, with the result that the tracked component 2 can be uniquely identified using the course of its movement through the production line 1. The serial number is not captured further inside the production line 1. In the present case, the serial number is an identification which is lasered into a surface of the component 2 and can be read by way of a camera device of the capture device 6.

In order to make it possible for a respective process system 3 processing and/or testing the component 2 to be informed of the component 2 in a particularly advantageous manner, provision is made for the electronic computing device 4 to provide a component information signal 8 for the process system 3 upon receiving a request signal 7, which characterizes a component property of the component 2, from the process system 3. This means that the process system 3 provides the request signal 7 for the electronic computing device 4, wherein the request signal 7 characterizes a request relating to the component property of the component 2 processed and/or tested or to be processed and/or tested by the process system 3. On account of the reception of the request signal 7, the electronic computing device 4 determines the component property of the component 2 characterized by the request signal 7. The component property may be a component type and/or a material of the component 2 and/or the serial number of the component 2 and/or an already determined test result of the component 2 and/or the processing state of the component 2 and/or the test state of the component 2. In order to inform the process system 3 of the component property, the electronic computing device 4 provides the component information signal 8 characterizing the component property of the determined component 2 for the process system 3 providing the request signal 7. On account of the reception of the component information signal 8, the process system 3 can store the component property of the component 2 in an internal memory of the process system 3. If the process system 3 is a test system which can be used to test the component 2, a test result characterizing the testing of the component 2 in the test system is determined by way of the test system and is stored in the internal memory in a manner assigned to the component property of the tested component 2. In addition, the test result determined in the course of testing the component 2 in the test system is provided for the electronic computing device 4 in the form of the processing signal 5. It is possible to track the component 2 along the production line 1 in a particularly simple manner by way of this interchange of data between the process systems 3 of the production line 1 and the electronic computing device 4, wherein the respective process systems 3 can be informed of respective component properties of the components 2 processed and/or tested in the respective process systems 3 in a particularly simple manner. This makes it possible to achieve particularly high process transparency.

The described method is based on the knowledge that circuit boards are already provided with unique coding, in particular the serial number, in a coil system by way of laser inscription in a pressing plant. All relevant information during production, for example material parameters, process parameters, quality features etc., are stored for this coding in a database. In order to assign further information within the production line 1, for example results from a crack detection system, to the serial number lasered onto the component 2, the serial number of the component 2 currently being tested or processed would have to be read out at each process system 3 in a production system of the prior art. This would respectively mean the use of a camera for each process system 3, which would give rise to high costs and is often not possible on account of a lack of installation space.

The electronic computing device 4 and the described method make it possible to logically track the component 2 through the production line 1, which may be a press line in particular, and to provide component information, in particular via the component information signal 8, for the process systems 3 via an open interface. The electronic computing device 4 may provide respective information relating to the component 2 for a superordinate server device which permanently stores the information.

In the method, the serial number or component coding of the component 2 is read out at the start of the production line 1. The serial number or the component 2, which may be a circuit board in particular, is logically carried along through the production line 1 in the electronic computing device 4. In this case, the electronic computing device 4 may comprise, in particular, a press controller for the production line 1 in the form of a press line, with the result that the component 2 can be tracked in a central press computing and control unit, in particular with the aid of a shift register. The component information signal 8 may be provided for any desired participants in the production line 1, for example a test system on a robot feeder. In this case, the test system on the robot feeder may send a request in the form of the request signal 7 to the electronic computing device 4, in particular to the register of the electronic computing device 4, which characterizes a request by which component 2 has just been tested. Feedback from the register, in particular the component property of the component 2 characterized by the component information signal 8, can be stored, together with the test result, in the internal memory of the test system, which is a database in particular. The shift register of the electronic computing device 4 can be enriched with information as the component 2 passes through the production line 1, which information can be read out from the register and processed further at another location in the production line 1, in particular by a process system 3 which does not provide the corresponding information via the processing signal 5. In particular, a crack testing system of the production line 1 can detect a crack in the component 2 and the computing device 4 stores the first test result characterizing the crack in the register in a manner assigned to the corresponding component 2. This first test result is carried along with the component 2 as it passes through the production line 1 by way of the register and can be evaluated by a removal robot of the production line 1. The removal robot therefore receives the component information signal 8 characterizing the first test result and can react differently in the case of a defective component than in the case of defect-free components. In particular, the defective component can be deposited in a scrap container or can be deposited on a discharge conveyor in a twisted manner so that the component stands out as defective to workers.

Component-classifying information relating to the component can be provided for the electronic computing device 4 from outside the production line 1. In particular, a steel manufacturer providing a starting material for the component could report a surface defect of a coil to be subdivided into the circuit boards in a defined longitudinal section of the coil to the electronic computing device. All circuit boards from this longitudinal section of the coil can be assigned to a corresponding note in the register during circuit board cutting and/or when applying the serial number. An item of defect information characterizing the surface defect may be provided for the process systems 3 of the production line 1. As soon as a serial number provided with the note in the register is captured by way of the capture device 6, the information in the shift register is carried along with the component through the production line 1. If appropriate, defined processing steps of the component 2 in the production line 1 can be adapted on the basis of the note.

Overall, embodiments of the invention show how a register can be provided for the purpose of tracking components in production lines 1, in particular press lines.

LIST OF REFERENCE SIGNS

1 Production line
2 Component
3 Process system
4 Electronic computing device
5 Processing signal
6 Capture device
7 Request signal
8 Component information signal

What is claimed is:

1. A method for tracking a component in a production line comprising a plurality of process systems, the method comprising:
at least one of processing or testing components by each of the plurality of process systems;
providing, by each of the plurality of process systems, a processing signal characterizing the at least one of the processing or the testing for a computing device,
tracking, by the computing device, the component through the production line along the plurality of process systems based on the processing signals received by the computing device,
receiving a signal from one of the plurality of process systems of the production line, wherein the signal is received at the computing device,
determining, by the computing device, the component that is at least one of processed or tested in the one process system, and
providing, by the computing device, at least one component information signal characterizing a component property of the determined component for the one process system, wherein
the tracking includes capturing a serial number of the component at an entrance of the production line, the at least one component information signal is sent to each of the plurality of process systems in the production line and includes the serial number, the plurality of process systems in the production line are configured to process the component without further capturing the serial number, so that after the capturing of the serial number at the entrance of the production line the tracking of the component is conducted by relying only on a course of movement of the component through the production line,
using the one process systems as a test system, determining a test result by testing the determined component, and based on the received signal, storing the test result in a memory device of the test system in a manner assigned to the determined component characterized by the component information signal.

2. The method according to claim 1, wherein:
a test result determined by the one process system is received by the computing device and is assigned to the determined component.

3. The method according to claim 1, wherein:
the component information signal is associated with a test result of the determined component.

4. The method according to claim 1, wherein:
the determined component is tracked in the computing device by a shift register.

5. The method according to claim 1, wherein the component property is a component type, a material of the component, an already determined test result of the component, a processing state of the component, and a test state of the component.

6. The method according to claim 1, wherein the computing device is a superordinate electronic computing device.

7. An electronic computing device for tracking a component in a production line comprising a plurality of process systems, wherein the electronic computing device is configured to:
receive a signal by each of the plurality of process systems of the production line,
track the component through the production line along the plurality of process systems based on the received processing signals,
receive a signal from one of the plurality of process systems of the production line, wherein the signal is received at the computing device,
determine the component that is at least one of processed or tested in the process system, and
provide a component information signal characterizing the determined component for the process system, wherein
the tracking includes capturing a serial number of the component at an entrance of the production line, the component information signal that is sent to each of the plurality of process systems in the production line includes the serial number, the plurality of process systems in the production line are configured to process the component without further capturing the serial number, so that after the capturing of the serial number at the entrance of the production line the tracking of the component is conducted by relying only on a course of movement of the component through the production line,
using the one process systems as a test system, determining a test result by testing the determined component, and
based on the received signal, storing the test result in a memory device of the test system in a manner assigned to the determined component characterized by the component information signal.

8. The electronic computing device according to claim 7, wherein a component property is a component type, a material of the component, an already determined test result of the component, a processing state of the component, and a test state of the component.

9. The electronic computing device according to claim 7, wherein the electronic computing device is a superordinate electronic computing device.

* * * * *